United States Patent
Yu

(10) Patent No.: US 9,712,327 B1
(45) Date of Patent: *Jul. 18, 2017

(54) SYSTEM AND METHOD FOR REMOTE STORAGE AUDITING

(71) Applicant: Google Inc., Mountain View, CA (US)

(72) Inventor: Harlan Yu, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/299,779

(22) Filed: Oct. 21, 2016

Related U.S. Application Data

(63) Continuation of application No. 11/797,485, filed on May 3, 2007, now Pat. No. 9,497,028.

(51) Int. Cl.
| | |
|---|---|
| *H04L 9/32* | (2006.01) |
| *G06F 17/30* | (2006.01) |
| *H04L 9/06* | (2006.01) |
| *H04L 9/14* | (2006.01) |
| *H04L 9/30* | (2006.01) |
| *H04L 9/08* | (2006.01) |

(Continued)

(52) U.S. Cl.
CPC ...... *H04L 9/3247* (2013.01); *G06F 17/30864* (2013.01); *G11B 20/0021* (2013.01); *H04L 9/0643* (2013.01); *H04L 9/0861* (2013.01); *H04L 9/14* (2013.01); *H04L 9/3093* (2013.01); *H04L 63/0428* (2013.01); *H04L 63/06* (2013.01)

(58) Field of Classification Search
USPC ............. 713/176, 168, 170, 181; 726/25, 30
See application file for complete search history.

(56) References Cited

U.S. PATENT DOCUMENTS

| | | | |
|---|---|---|---|
| 6,928,553 B2 * | 8/2005 | Xiong | H04L 63/02 726/8 |
| 6,990,579 B1 | 1/2006 | Herbert et al. | |
| 7,043,636 B2 | 5/2006 | Smeets | |

(Continued)

OTHER PUBLICATIONS

Chen, C.C., et al., "Automatically Annotating and Integrating Spatial Datasets", In the Proceedings of International Symposium on Spatial and Temporal Databases, Santorini Island, Greece, 2003, 18 pgs.

(Continued)

*Primary Examiner* — Amare F Tabor
(74) *Attorney, Agent, or Firm* — Fish & Richardson P.C.

(57) ABSTRACT

The present invention relates to remote storage auditing. In another embodiment, a remote storage auditing system may include a first remote storage manager configured to be a data owner, a second remote storage manager configured to be a storage donor, and a remote storage auditor. The first remote storage manager sends a data block and a signed fingerprint for the data block to the second remote storage manager. The second remote storage manager verifies that the signed fingerprint is associated with the data block and stores the data block and signed fingerprint. The second remote storage manager calculates a fingerprint for a sub-block of the data block, and sends the fingerprint for the sub-block and signed fingerprint to the remote storage auditor. The remote storage auditor audits a sub-block of the data block and verifies the fingerprint for the sub-block and signed fingerprint.

20 Claims, 9 Drawing Sheets

(51) Int. Cl.
*H04L 29/06* (2006.01)
*G11B 20/00* (2006.01)

(56) References Cited

U.S. PATENT DOCUMENTS

| | | | |
|---|---|---|---|
| 7,206,934 B2* | 4/2007 | Pabla | H04L 63/02 709/226 |
| 7,373,509 B2 | 5/2008 | Aissi et al. | |
| 7,539,867 B2* | 5/2009 | Bolosky | G06F 17/30097 713/175 |
| 7,571,490 B2 | 8/2009 | Wong | |
| 7,624,431 B2* | 11/2009 | Cox | H04L 63/0236 380/270 |
| 7,727,070 B2* | 6/2010 | Shelby | G06Q 30/02 380/251 |
| 7,765,160 B2 | 7/2010 | Niles et al. | |
| 7,908,654 B2* | 3/2011 | Belenky | H04L 9/3239 726/22 |
| 8,086,842 B2* | 12/2011 | Sidhu | H04L 63/0823 713/150 |
| 8,200,760 B2 | 6/2012 | Jacobs | |
| 8,204,992 B2* | 6/2012 | Arora | H04L 29/06 709/201 |
| 8,230,221 B2* | 7/2012 | Haddad | H04L 63/123 713/170 |
| 8,582,777 B2* | 11/2013 | Urivskiy | H04L 9/0822 380/277 |
| 8,627,086 B2 | 1/2014 | Gehrmann et al. | |
| 2003/0023851 A1 | 1/2003 | Peha | |
| 2006/0137006 A1 | 6/2006 | Ramzan et al. | |
| 2008/0022403 A1* | 1/2008 | Chen | H04L 63/1416 726/23 |
| 2014/0173285 A1 | 6/2014 | Manchala | |

OTHER PUBLICATIONS

Kubiatowicz, J., et al., "Ocenstore: An Architecture for Global-Scale Persistent Storage", In Proceedings of the 9th International Conference on Architectural Support for Programming Languages and Operating Systems (ASPLOS), 2000, 12 pgs.

Caronni, G., et al., "Establishing Trust in Distributed Storage Providers", Peer-to-Peer Computing (P2P 2003), Sep. 1-3, 2003, pp. 128-133.

Cox, L.P., et al., "Pastiche: Making Backup Cheap and Easy", Proceedings of the 5$^{th}$ Symposium on Operating Systems Design and Implementation, Dec. 2002, 15 pgs.

Merkle, R.C., "Secrecy, Authentication, and Public Key Systems", A Dissertation Submitted to the Department of Electrical Engineering and the Committee on Graduate Studies of Stanford University in Partial Fulfillment of the Requirements for the Degree of Doctor of Philosophy, Jun. 1979, 187 pgs.

\* cited by examiner

SYSTEM AND METHOD FOR REMOTE STORAGE AUDITING

CROSS-REFERENCE TO RELATED APPLICATIONS

This application is a continuation application of and claims priority to U.S. application Ser. No. 11/797,485, filed on May 3, 2007, the entire contents of which are hereby incorporated by reference.

BACKGROUND OF THE INVENTION

Field of the Invention

The present invention relates to computer aided remote storage auditing.

Background Art

The demand for data storage continues to increase. The need for accessibility of data from multiple locations across the internet also continues to increase. Therefore, the ability to store and access data remotely is increasingly important in a variety of applications. One solution is to provide large storage at one or more central locations. Centralized storage, however, requires infrastructure that can support high bandwidth and large storage capacity. Such infrastructure is costly. Another solution is a distributed approach where computer systems having storage are coupled across one or more networks. In the absence of a central manager it can be difficult to use storage efficiently. For instance, with such networked systems, individual computer systems may have storage that goes unused. Peer-to-peer storage architectures have been developed to use this available storage to lower the bandwidth and storage costs to central managers. Peer-to-peer systems however, are difficult to manage and audit. For example, some users may attempt to cheat the system by discarding data after initial storage. Consequently, in peer-to-peer systems it is difficult to ensure that data is properly being stored.

What is needed is improved auditing of remote storage.

BRIEF SUMMARY OF THE INVENTION

The present invention relates to remote storage auditing.

In an embodiment, a remote storage auditor audits a storage donor that stores a data block on behalf of a data owner in a distributed storage environment. The remote storage auditor queries the storage donor for audit information associated with a sub-block of the data block. The remote storage auditor receives the audit information in the form of an audit path associated with the sub-block and a fingerprint for the data block. The remote storage auditor verifies the presence of the data block based on the audit information.

In another embodiment, a remote storage manager locally stores remote data. The remote storage manager receives remote data from a client for local storage in the form of a data block and a fingerprint for the data block. The remote storage manager verifies that the remote data is associated with the client and locally stores the remote data and fingerprint. The remote storage manager returns the locally stored remote data to the client in response to a return request. The remote storage manager generates an audit path for the locally stored data block in response to an audit request. The remote storage manager sends audit information to a remote storage auditor in the form of the audit path associated with a sub-block of the first data block and the first fingerprint.

In a further embodiment, the remote storage manager stores data remotely. The remote storage manager may encrypt data and send it to another remote computer system. The encrypted data may be in the form of a data block and a signed fingerprint for the data block. The remote storage manager may retrieve the encrypted data sent to the remote computer system.

In another embodiment, a remote storage auditing system may include a first remote storage manager configured to be a data owner, a second remote storage manager configured to be a storage donor, and a remote storage auditor. The first remote storage manager sends a data block and a signed fingerprint for the data block to the second remote storage manager. The second remote storage manager verifies that the signed fingerprint is associated with the data block and stores the data block and signed fingerprint. The second remote storage manager calculates a fingerprint for a sub-block of the data block, and sends the fingerprint for the sub-block and signed fingerprint to the remote storage auditor. The remote storage auditor audits a sub-block of the data block and verifies the fingerprint for the sub-block and signed fingerprint.

Also, in an embodiment, a computer implemented remote storage auditing system may operate on one or more computer systems.

Further embodiments, features, and advantages of the invention, as well as the structure and operation of the various embodiments of the invention are described in detail below with reference to accompanying drawings.

BRIEF DESCRIPTION OF THE DRAWINGS/FIGURES

The present invention will be described with reference to the accompanying drawings, wherein like reference numbers indicate identical or functionally similar elements. Also, the leftmost digit(s) of the reference numbers identify the drawings in which the associated elements are first introduced.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which the invention would be of significant utility.

Overview

The present invention relates to computer aided remote storage auditing. In a remote storage environment, users send information to one or more remote users for remote storage. This can be, for example, a peer to peer (P2P) system or a P2P system with a central manager. A given user can send information for remote storage and receive information from a remote user for local storage. Users access the remote storage environment using computer systems or clients.

Example Remote Storage Auditing Environment

Figure 1A:
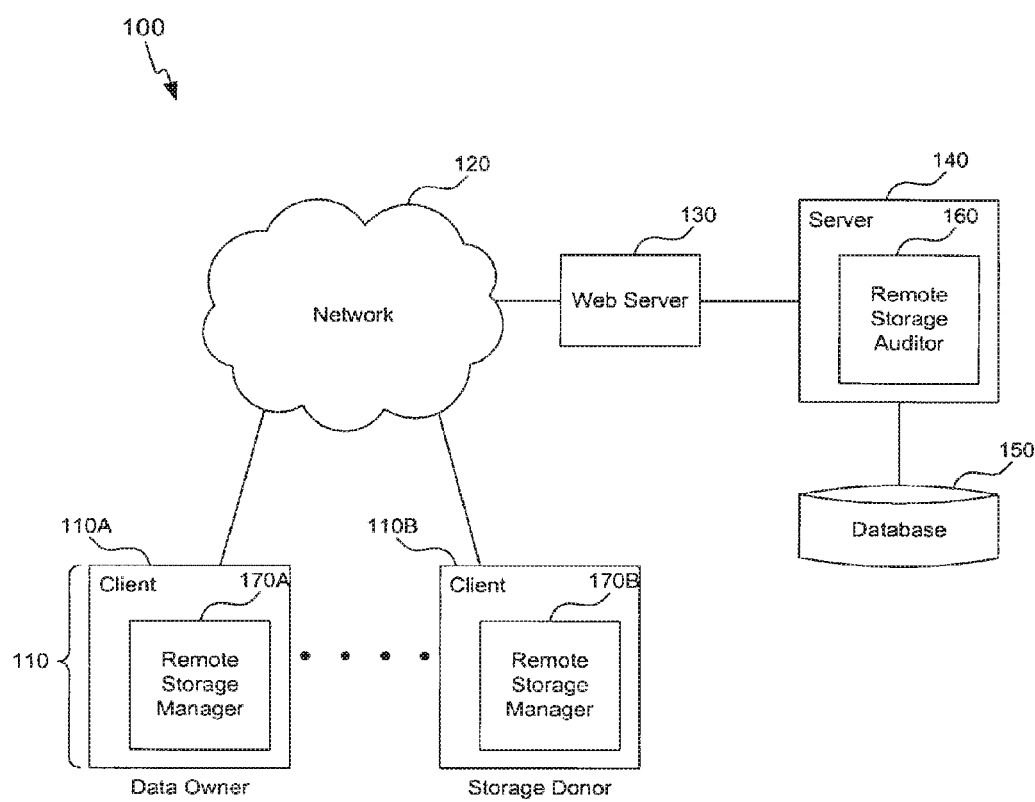
FIGS. 1A and 1B are diagrams of a remote storage auditing system according to an embodiment of the present invention.

Various aspects of the present invention can be implemented by software, firmware, hardware, or a combination thereof. An example of a remote storage auditing system 100 is depicted in FIG. 1A. Remote storage auditing system 100 includes one or more clients 110, web server 130, server 140, and database 150. Clients 110 may be coupled through one or more network(s) 120 to web server 130 and to one another. Network(s) 120 can be any one or more networks or combination of networks extending over small to large areas, including, but not limited to the internet. Server 140 is coupled to web server 130 and to database 150.

In an embodiment, server 140 includes a remote storage auditor 160. Remote storage auditor 160 may operate on server 140 and interface with database 150. Clients 110 each include a remote storage manager 170. Remote storage managers 170 may operate on one or more clients 110 as a storage donor or a data owner, or both, as described below. For clarity, in FIG. 1, clients 110 are labeled 110A and 100B to show examples of clients having remote storage managers 170 that operate as data owners and storage donors, respectfully. In this example, client 100A is referred to as a data owner and client 110B is referred to as a storage donor. However, any combination of clients operating as storage donors and data owners may be used. Clients that store data remotely are referenced in this application as data owners. Clients that store remote data are referenced in this application as storage donors. Operations performed by data owners and storage donors referenced in this application may refer to operations performed by users of the clients or to operations performed by the remote storage managers without user input.

Figure 1B:
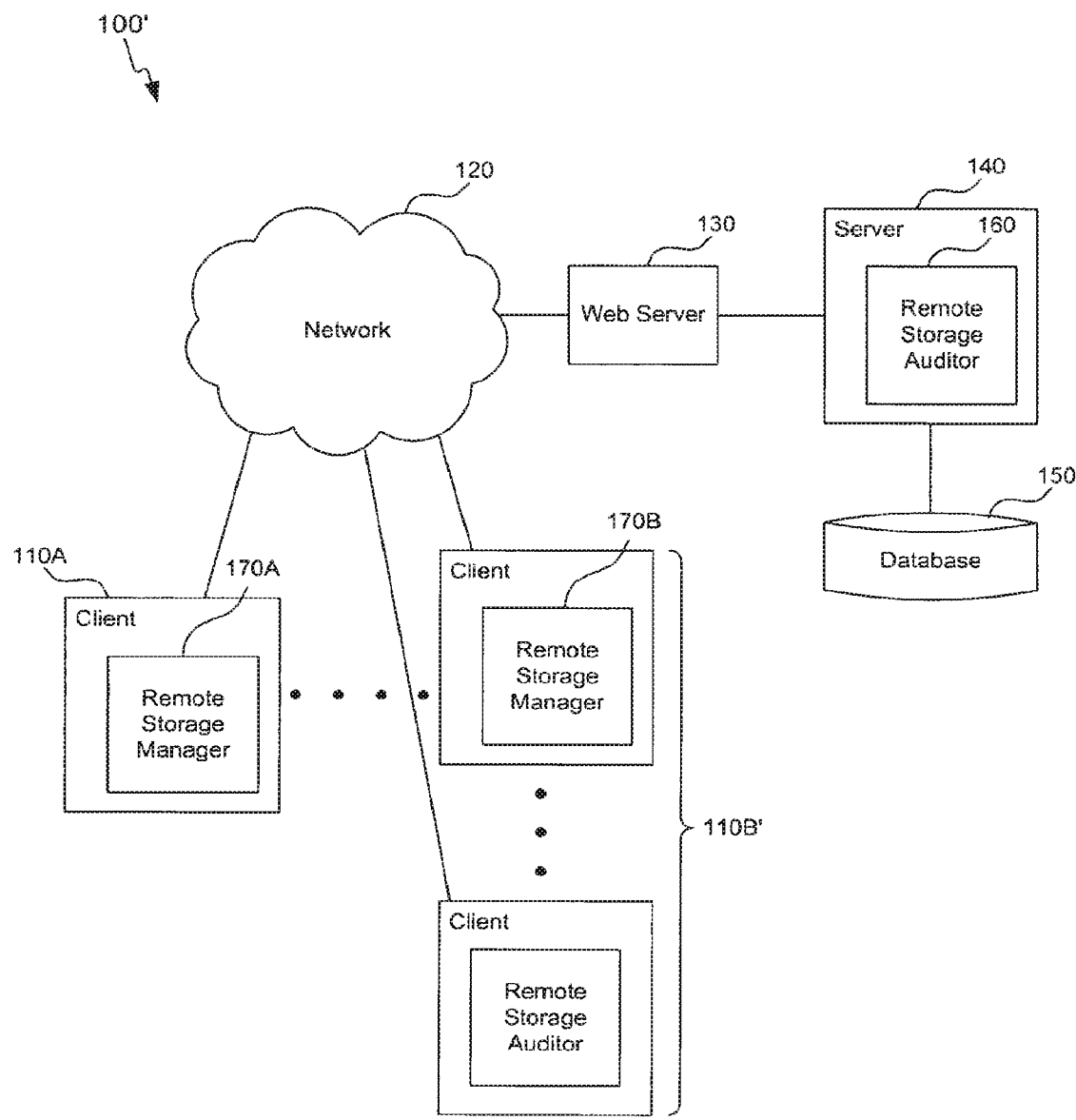

In an embodiment, remote storage auditor 160 may manage storage quotas for clients 110. These storage quotas represent the amount of storage allocated for each client 110 regardless of particular users of devices at a client 110. In another embodiment, remote storage auditor 160 manages the storage quotas for each user. These storage quotas represent the amount of storage allocated for each user regardless of what client 110 he or she uses. Remote storage auditor 160 may also compensate storage donor 110B for storing data from data owner 110A. In another embodiment, FIG. 1B depicts more than one client 110B' which may operate as redundant storage donors. Clients 110B' are independently connected to network(s) 120 to ensure that data is stored on distinct devices. In a further embodiment, remote storage auditor 160 may scale the quota of a data owner 110A that requests redundant storage donors 110B' in proportion to the redundancy. Remote storage auditor 160 may periodically audit storage donor 110B for the stored data and adjust storage quotas based on audit performance.

In order to ensure that storage donor 110B only stores information from valid clients, data owner 110A may provide identification to storage donor 110B. In an embodiment, data owner 110A may encrypt some or all of the information by various encryption methods readily known in the art. Data owner 110A signs a fingerprint of the data with a private key and storage donor 110B may verify the signed fingerprint with a public key. In one embodiment, the fingerprint is a root hash of the data.

In another embodiment, remote storage auditor 160 may provide a signed token containing storage session information. For example, the storage session information may include the identity of data owner 110A, the identity of storage donor 110B and the root hash of the data. Remote storage auditor 160 may sign the token with a private key. Storage donor 110B receives the token from data owner 110A and verifies its contents with a public key. This may provide further assurance that storage donor 110B only stores information from valid clients and is described in greater detail with reference to FIG. 4B below.

Upon an audit request, storage donor 110B may use one or more functions (e.g., hash functions) to generate the audit information and provides it to remote storage auditor 160 for verification. Storage donor 110B, however, could cheat the audit by pre-calculating the audit information and then moving the data to another device or deleting it. Storage donor 110B could then provide the pre-calculated audit information to remote storage auditor 160 upon request.

In order to reduce the incentive to pre-calculate the audit information, remote storage auditor 160 directs storage donor 110B to provide an audit path for one or more randomly selected sub-blocks of the stored data. In this example, the audit information is a multi-level hash path from the sub-block to the root hash of the stored data. To cheat this type of audit with high probability, all possible audit paths for every sub-block of the stored data would have to be pre-calculated and stored. Storage of the pre-calculated audit paths would require more disk space than the stored data. The audit path provided to the auditor for any particular audit, however, requires relatively little bandwidth between the storage donor and the auditor. Additionally, verifying the audit path from the sub-block to the root verifies the presence of the entire stored data with high probability.

Remote Storage Auditor

Figure 2:
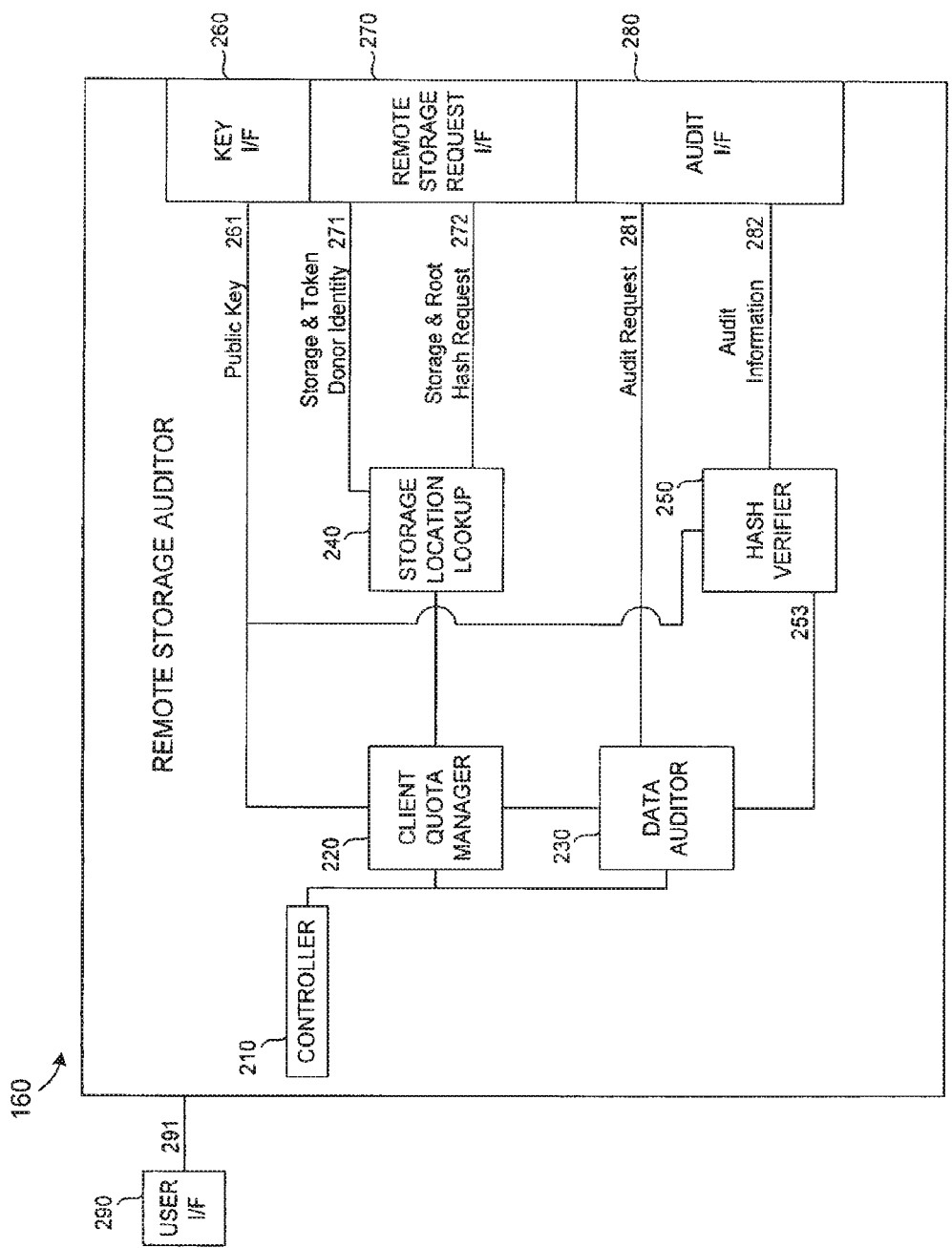
FIG. 2 is a diagram of a remote storage auditor according to an embodiment of the present invention.

FIG. 2 depicts a remote storage auditor 160 according to an embodiment of the present invention. Remote storage auditor 160 may include a controller 210, and interfaces for communicating with clients (260, 270, and 280). Key interface 260 may provide public key 261 to clients 110. Remote storage request interface 270 communicates with data owner 110A and audit interface communicates with storage donors 110B. Remote storage auditor 160 may also be coupled to a user interface 290 to accept input and deliver output to a user of remote storage auditor 160. Remote storage auditor 160 may include client quota manager 220, storage location lookup 240, data auditor 230 and hash verifier 250.

In an embodiment, remote storage auditor 160 may direct remote storage managers 170 operating on clients 110 to available storage space supplied by other clients. Remote storage auditor 160 may also audit clients 110. For example, remote storage auditor 160 may direct a remote storage manager 170A operating as a data owner to an available remote storage manager 170B operating as a storage donor. Remote storage auditor 160 may respond to a storage request made by a data owner. Storage location lookup 240 receives a storage request 272 and interfaces with client quota manager 220 to provide an identity of an available storage donor 271 to the data owner. This operation is described in greater detail in the storing data section below.

In another embodiment, remote storage auditor 160 may provide a signed token containing storage session information. For example, the storage session information may include the identity of data owner 170A, the identity of storage donor 170B and the root hash of the data. Remote storage auditor 160 may sign the token with a private key and storage donor 170B receives the signed token from data owner 170A and verifies its contents with a public key. This may provide further assurance that storage donor 110B only stores information from valid clients and is described in greater detail with reference to FIG. 4B below.

In another embodiment, remote storage auditor 160 may issue audit requests to remote storage manager 170B operating as storage donors. The frequency of the audits may be periodic or may be based on client or user reputation or other criteria. Data auditor 230 sends an audit request 281 to a storage donor, and receives audit information 282. Audit request 281 defines a sub-block of a data block to verify. Hash verifier 250 uses public key 261 to verify audit information 282 and sends results to data auditor 230. Data auditor 230 may interface with client quota manager 220 to punish or reward the storage donor based on the audit results. Client quota manager 220 may maintain client or user reputation information to schedule audits and change the size of a client's or user's available remote storage based on audit results. This operation is described in greater detail in the auditing storage donors section below.

Remote Storage Manager

Figure 3:
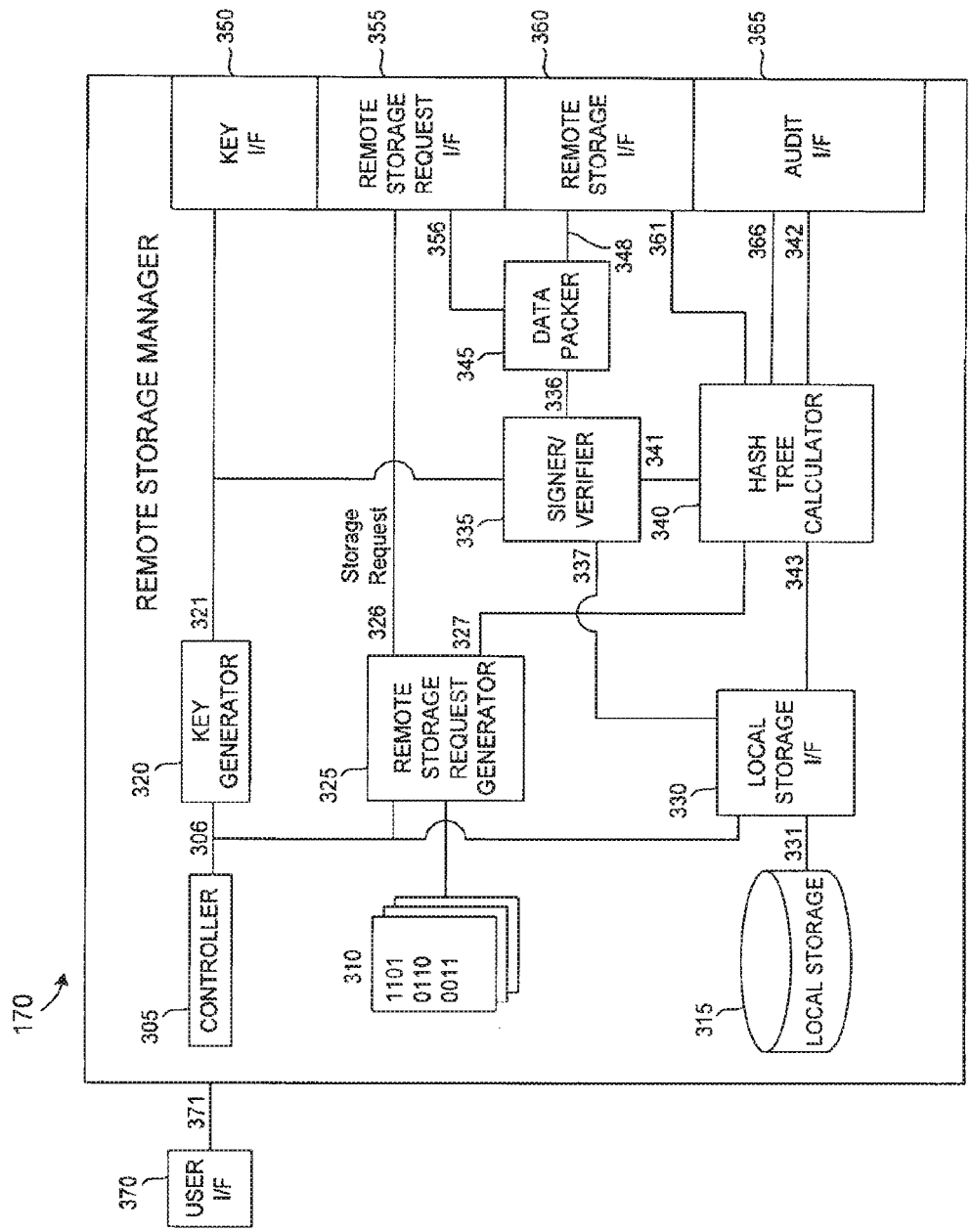
FIG. 3 is a diagram of a remote storage manager according to an embodiment of the present invention.

In an embodiment, a remote storage manager 170 may operate as a data owner or a storage donor or both. Remote storage manager 170 is depicted in FIG. 3 according to an embodiment of the present invention. Remote storage manager 170 may include a controller 305, and interfaces for communicating with a remote storage auditor 160 and other remote storage managers (350, 355, 360, 365). Key interface 350 may provide public key 321 to clients 110, remote storage auditor 160, or a third party publisher (not shown). Remote storage request interface 355 and audit interface 365 communicates with remote storage auditor 160. Remote storage interface 360 communicates with clients 110. Remote storage manager 170 may also be coupled to a user interface 370 to accept input and deliver output to a user of remote storage manager 170. Remote storage manager 170 may also include data 310 for remote storage, remote storage request generator 325. Additionally, remote storage manager may include key generator 320, signer verifier 335 and data packer 345. Remote storage manager 170 may also include a local storage 315, local storage interface 330, and a hash tree calculator 340. In another embodiment, local storage interface 330 may access storage outside the remote storage manager (not shown).

In another embodiment, remote storage manager 170 may operate as a data owner. Remote storage request generator 325 issues a storage request 326 to a remote storage auditor for storing data 310. Hash tree calculator 340 calculates a fingerprint for data step 310. In an embodiment, key generator 320 may generate a public and a private key 321 for data owner 170. Data owner 170 may publish the public key with a publisher (not shown), or with a remote storage auditor and stores the private key locally. Signer/verifier 335 may use the private key 321 to sign fingerprint 341. Data packer 345 receives the location for a storage donor from a remote storage auditor and sends data 310 and signed fingerprint 336 to the storage donor. This is described in greater detail in the storing data section below. In a further embodiment, the fingerprint is sent with the storage request. In this case, data packer 345 received the location along with a signed token and sends data 310, signed fingerprint 336 and signed token to the storage donor.

In another embodiment, remote storage manager 170 may operate as a storage donor for locally storing data from a data owner. Hash tree calculator 340 receives a data block and signed fingerprint 361 from a data owner and calculates a fingerprint for the data block. Signer/verifier 335 uses public key 321 associated with the data owner the signed fingerprint and the calculated fingerprint to verify that the data block is from a valid data owner. If the verification is successful, local storage interface 330 stores the data block and signed fingerprint on local storage 315. This is described in greater detail in the storing data section below.

In a further embodiment, storage donor additionally receives a signed token from the data owner. Storage donor verifies the contents of the signed token with a public key associated with the remote storage auditor. The contents of the signed token may contain storage session information. For example, the storage session information may include the identity of the data owner, the identity of the storage donor and the root hash for the data. This may provide further assurance that storage donor 110B only stores information from valid clients and is described in greater detail with reference to FIG. 4B below.

In another embodiment, remote storage manager 170 may operate as a storage donor in response to an audit request. Hash tree calculator 340 receives an audit request 366 defining a sub-block of a data block to audit. Local storage interface 330 retrieves the data block and signed fingerprint from local storage 315. Hash tree calculator 240 calculates an audit path from the sub-block to the root and sends the audit path and signed fingerprint to the remote storage manager. This is described in greater detail in the auditing section below.

Storing Data Remotely and Locally Storing Remote Data

Figure 4A:
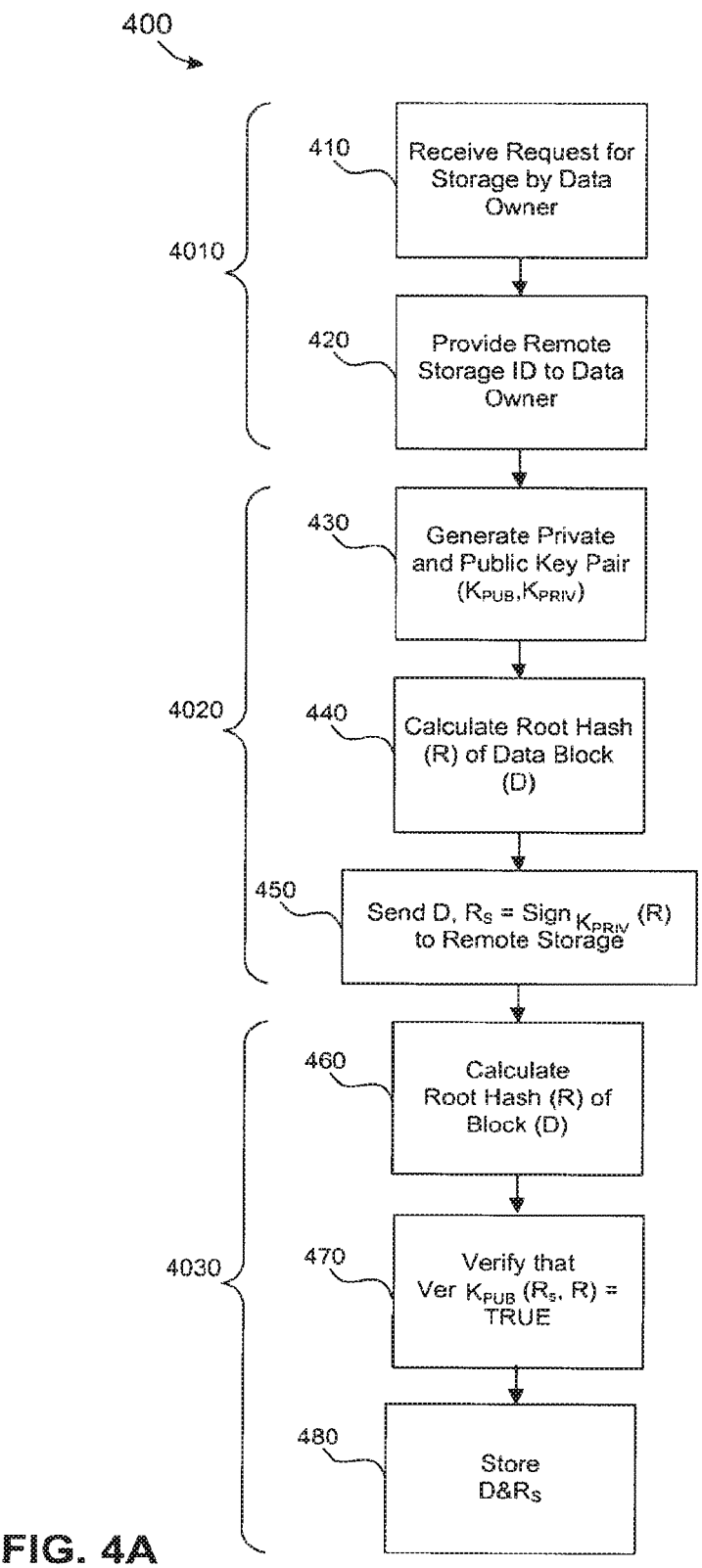
FIG. 4A is a flow diagrams for a storing process according to an embodiment of the present invention.

In a remote storage environment, a client or user thereof wanting to store a data block requests the location of a storage donor from a remote storage auditor. For brevity, a method for storing data on a storage donor is described with reference to remote storage auditing system 100 but is not necessarily intended to be limited to the structure of remote storage auditing system 100. In this example, a client 110A operating as a data owner and a client 110B operating as a storage donor is referenced. However, any combination of clients 110 operating as storage donors and data owners may be used. A storage method 400 is depicted in FIG. 4A. According to an embodiment of the present invention, steps 4010 may be performed by a remote storage auditor 160, steps 4020 may be performed by a data owner 110A, and steps 4030 may be performed by a storage donor 110B.

Remote storage auditor 160 receives a request for storage from a data owner (step 410) and provides the location for an available storage donor to the data owner (step 420). The data owner generates a signature to identify itself to the storage donor. In an embodiment, the data owner generates a public key ($K_{PUB}$) and a private key ($K_{PRIV}$) and may publish the public key with a publisher (not shown), or with a remote storage auditor and stores the private key locally (step 430). This key generation may only be performed the first time the data owner requests storage. This is an asymmetric encryption where a private key is used to encrypt data which can later be decrypted by anyone with the corresponding public key. In other embodiments, other signature methods may be used, for example, a single key (symmetric encryption), combined keys (shared secret), or other signatures.

Figure 6:
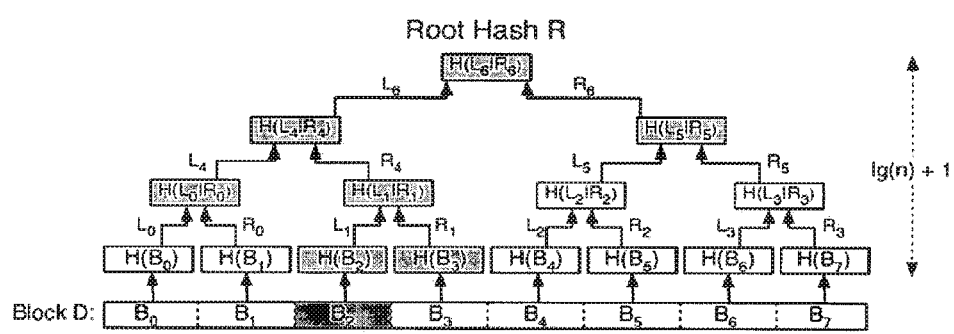
FIG. 6 is a hash tree according to an embodiment of the present invention.

The data owner calculates the fingerprint for the data block to be stored (step 440). In one example, the data owner uses a hash function to generate the fingerprint; however, other functions may be used. FIG. 6 shows a Merkle tree for data block D. Hash function H is applied to sub-blocks $B_0$-$B_7$ to produce leaf hashes $L_0$-$L_3$, and $R_0$-$R_3$. Hash function H is then applied recursively to pairs of hashes (i.e. $H(L_6|R_6)=H(H(L_4|R_4)|H(L_5/R_5)))$ until a single hash, the root hash, is produced. In this example root hash R is the hash $H(L_6|R_6)$. In an embodiment the data owner generates signed root hash $R_S$ by signing the root hash R with the private key $K_{PRIV}$ and sends data block D and signed root hash $R_S$ to the storage donor (step 450).

The storage donor then calculates the root hash R of data block D (step 460). The storage donor may then verify signed root hash $R_S$ with the public key $K_{PUB}$ and the calculated root hash R (step 470). This ensures that data block D is, in fact, from the data owner and prevents the storage donor from being used by unsecured and unmonitored users. After the storage donor has verified data block D, it then stores signed root hash $R_S$ and data block D locally (step 480). The storage donor can then respond to routine retrieve requests from the data owner.

Figure 4B:
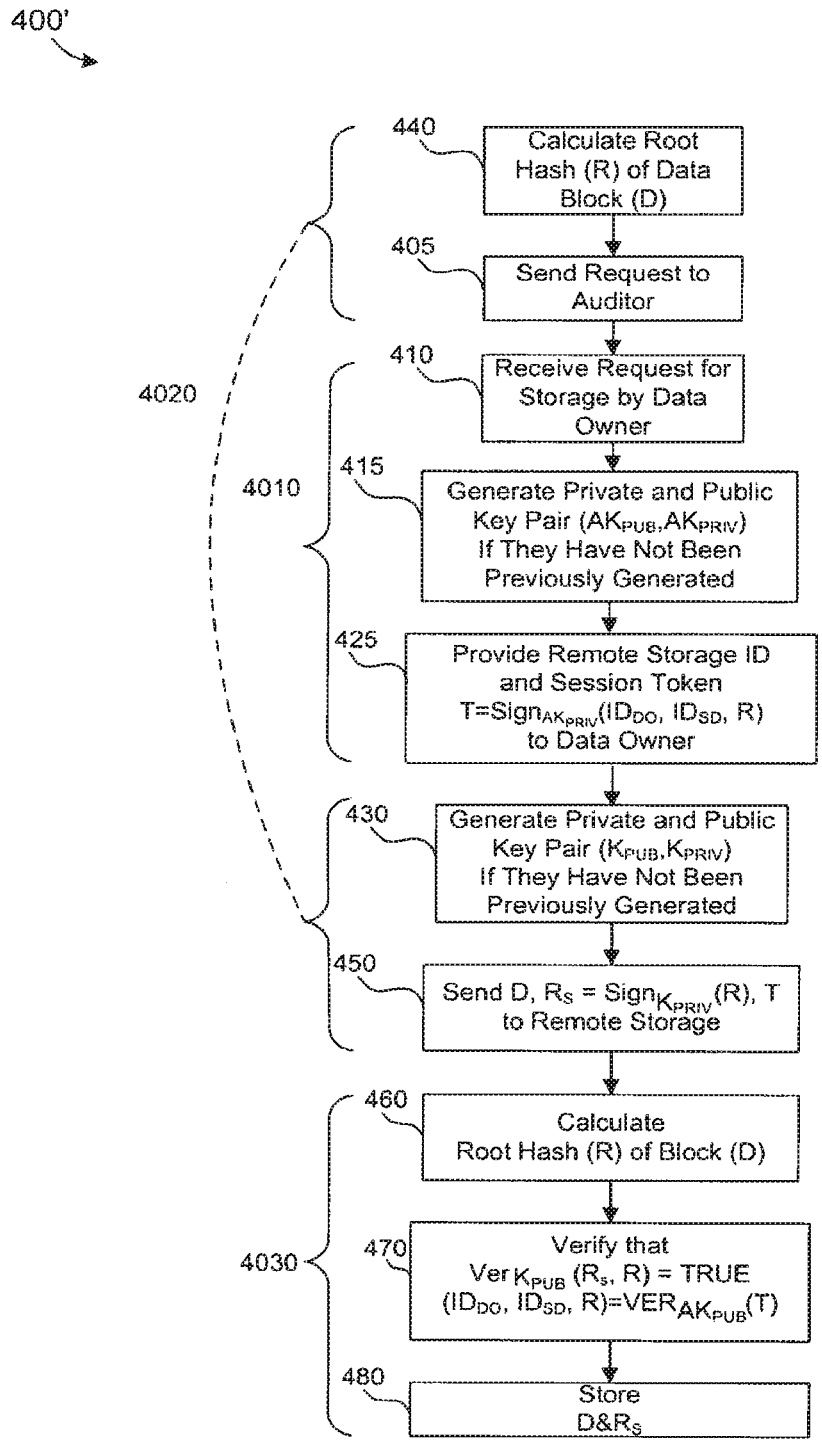
FIG. 4B is a flow diagrams for a storing process according to another embodiment of the present invention.

Storage method 400' depicted in FIG. 4B is an alternative implementation. According to an embodiment of the present invention, steps 4010 may be performed by a remote storage auditor 160, steps 4020 may be performed by a data owner 110A, and steps 4030 may be performed by a storage donor 110B. In this alternative implementation data owner 110A calculates the fingerprint for the data block to be stored (step 440) prior to issuing a storage request (step 405).

Remote storage auditor 160 receives a request for storage from a data owner (step 410) and generates storage session information. For example, the storage session information may include the identity of data owner 170A $ID_{DO}$, the identity of storage donor 170B $ID_{SD}$ and the root hash for the data R. Remote storage auditor 160 generates a public key ($AK_{PUB}$) and a private key ($AK_{PRIV}$) and may publish the public key with a publisher (not shown), or store it locally and stores the private key locally (step 425). This key generation may only be performed the first time the data owner requests storage. Remote storage auditor 160 then signs the storage session information with its private key $AK_{PRIV}$ to produce token T. This is an asymmetric encryption, however, in other embodiments, other signature methods may be used as described above. Remote storage auditor provides the location for an available storage donor and token T to the data owner (step 420).

In this embodiment, the data owner sends data block D, signed root hash $R_S$, and signed token T to the storage donor (step 450). The storage donor then verifies signed root hash Rs as described above and also verifies signed token T with the remote storage auditor's public key $AK_{PUB}$ (step 470). This may provide further assurance to the storage donor that the data owner is a valid client because the storage owner knows that the remote storage auditor has endorsed the storage session by signing the session information with its private key. This also allows the storage donor to ensure that the session information accurately reflects the identity of the data owner $ID_{DO}$, the identity of the data owner $ID_{DO}$ and the root hash of data block D.

Auditing Storage Donors

Figure 5:
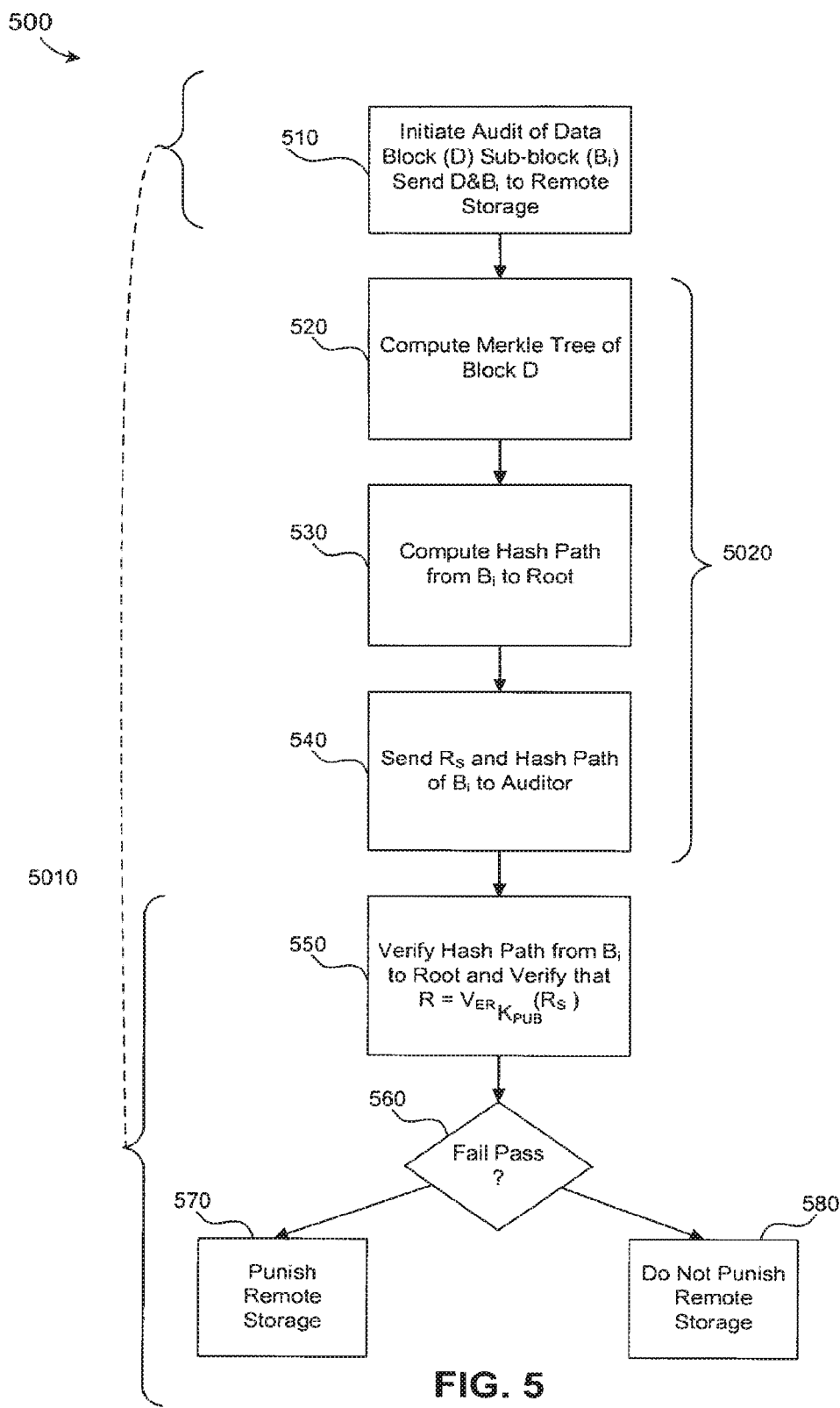
FIG. 5 is a flow diagram for the auditing process according to an embodiment of the present invention.

In a remote storage environment, a remote storage auditor 160 can monitor storage donors. For brevity, a method for auditing storage donors is described with reference to remote storage auditing system 100 but is not necessarily intended to be limited to the structure of remote storage auditing system 100. In one example, a client 110B operating as a storage donor is referenced. However, a remote storage auditor may audit any number of clients 110 operating as storage donors. An auditing method 500 is depicted in FIG. 5. According to an embodiment of the present invention, steps 5010 may be performed by a remote storage auditor 160, and steps 5020 may be performed by a storage donor 110B.

In an embodiment, the remote storage auditor initiates an audit of data block D by identifying a random sub-block Bi of data block D and sends that information to a storage donor (step 510). In an embodiment, the storage donor generates an audit path. In this example, the storage donor uses a multi-level hash function, such as a Merkle tree; however, other functions may be used. The storage donor generates the tree by hashing each sub-block of the data recursively (step 520).

Remote storage auditor 160 performs audits on a sub-block of the data, whereby the storage donor generates the multi-level hash information, but need only provide the audit path for the sub-block (step 530). In an embodiment, the audit path may be a hash representation of data in all the sub-blocks of data block D. In one example with 8 sub-blocks, the audit path comprises the hash nodes from the sub-block to the root. FIG. 6 shows a Merkle tree for data block D with the audit path from shown in gray. The audit path comprises one pair of hash nodes for each hash level and the root. For each hash level, the pair comprises the hash that contains sub-block $B_2$ and its companion hash. For example, with reference to FIG. 6, the audit path includes 3 pairs ($L_1,R_1$; $L_4,R_4$; and $L_6,R_6$) and the root This reduces the bandwidth required between the storage donor and the remote storage auditor since the hash path scales logarithmically with the size of the data block. This also discourages pre-calculating audit information because the storage space required for all possible audit results is greater that the storage space required for storing the data. For example, twice the storage space is required to store the Merkle tree for data block D than is required to store data block D. The storage donor sends the audit path to the remote storage auditor (step 540). The storage donor optionally provides signed root hash $R_S$ and/or sub-block $B_i$ to the remote storage auditor.

Upon receipt of the audit information, the remote storage auditor verifies the signature information (step 550). For example, where a multi-level hashing function is employed, the remote storage auditor can verify the hash path by hashing each level of child nodes starting at the leaf nodes and comparing the result with the parent node of the next level, ending with the root hash. Remote storage auditor 160 may then verify signed root hash $R_S$ with the public key $K_{PUB}$ and the calculated root hash R (step 550). Because the sub-block is selected randomly and all sub-blocks of the data are used in to generate the audit path, a passing audit either verifies the presence of the multi-level hash information or the data block. As discussed above, the required storage for the multi-level hash information is greater than that of the data block; therefore a passing audit is most likely a verification of the entire data block.

Upon completion of an audit, the storage donor and/or its user may be rewarded or penalized depending upon the audit results (steps 460-80). Audit frequency may be adjusted based on outcomes of prior audits. For example, remote storage auditor 160 may audit a trusted storage donor less frequently. Remote storage auditor 160 may then delete the audit information.

Remote storage auditor 160 may also manage the distributed storage environment. Management of the distributed storage environment may include managing user accounts and storage quotas, and identifying remote locations for storage. Data transmitted for remote storage is typically sent from the data owner to the storage donor. The remote storage auditor need not receive or store any portion of the remotely stored information, except as desired or required during auditing operations.

Alternatively, the distributed storage environment may be implemented in a peer-to-peer system without a central remote storage auditor, in which case audits can be performed by data owners and/or by a third party auditor.

Example Computer System Implementation

Various aspects of the present invention, such as client 110, web server 130, server 140, remote storage auditor 160 and remote storage manager 170, can be implemented by software, firmware, hardware, or a combination thereof. Clients 110 may be any computing or processing device that supports network communication. Example computing or processing devices include, but are not limited to, a computer, workstation, distributed computing system, embedded system, stand-alone electronic device, networked device, mobile device, set-top box, television, or other type of processor or computer system.

Figure 7:
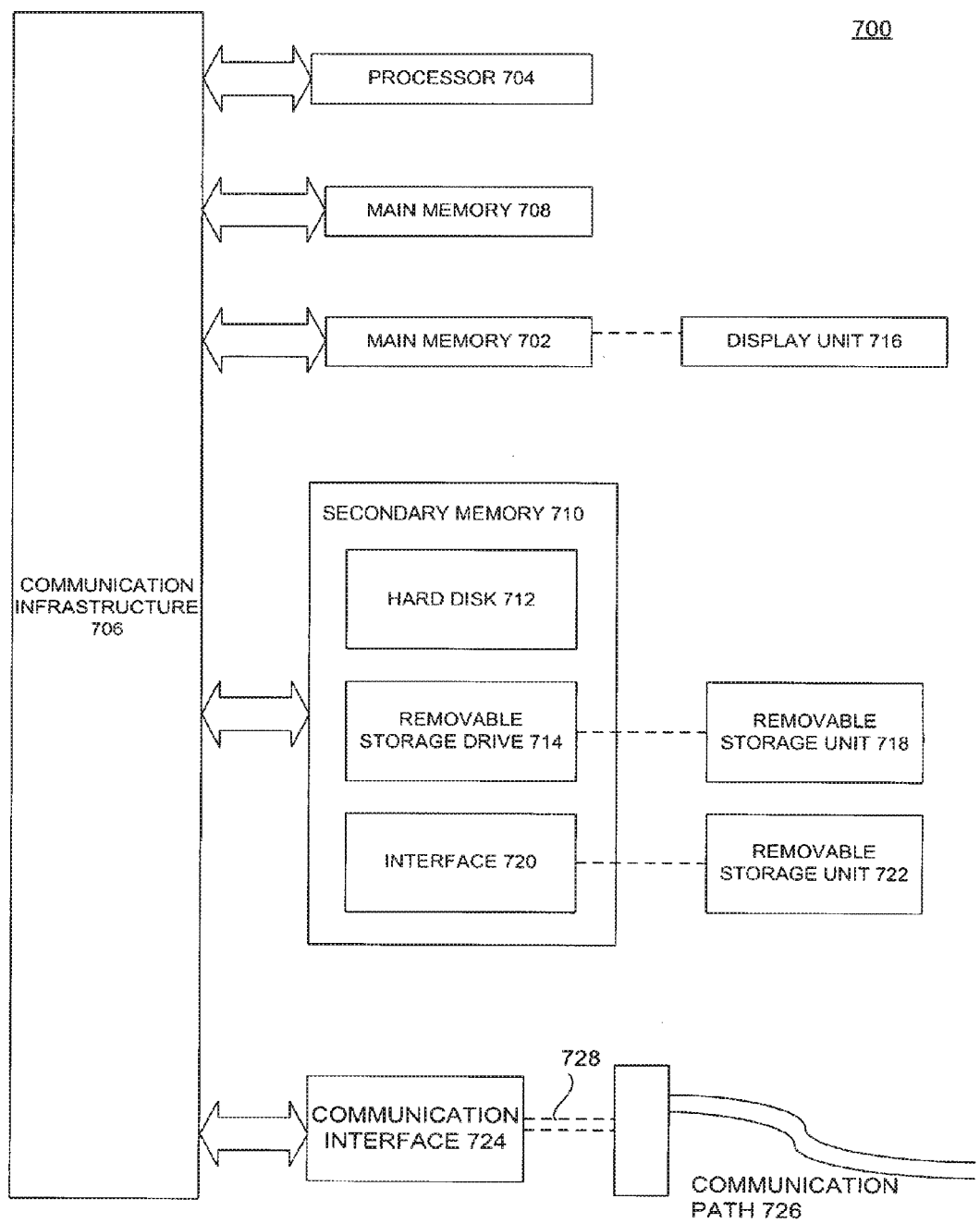
FIG. 7 is a diagram of an example computer system that can be used to implement an embodiment of the present invention.

FIG. 7 illustrates an example computer system 700 in which the present invention, or portions thereof, can be implemented as computer-readable code. Various embodiments of the invention are described in terms of this example computer system 700. After reading this description, it will become apparent to a person skilled in the relevant art(s) how to implement the invention using other computer systems and/or computer architectures.

Computer system 700 includes one or more processors, such as processor 704. Processor 704 can be a special purpose or a general purpose processor. Processor 704 is connected to a communication infrastructure 706 (for example, a bus or network).

Computer system 700 also includes a main memory 708, and may also include a secondary memory 710. Main memory 708 may include, for example, cache, and/or static and/or dynamic RAM. Secondary memory 710 may include, for example, a hard disk drive 712 and/or a removable storage drive 714. Removable storage drive 714 may comprise a floppy disk drive, a magnetic tape drive, an optical disk drive, a flash memory, or the like. The removable storage drive 714 reads from and/or writes to a removable storage unit 718 in a well known manner. Removable storage unit 718 may comprise a floppy disk, magnetic tape, optical disk, flash memory, etc., which is read by and written to by removable storage drive 714. As will be appreciated by persons skilled in the relevant art(s), removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also includes a main memory 702. Main memory 702 may include, for example, cache, and/or static and/or dynamic RAM. Main memory 702 may be separate from main memory 708 or may be a part thereof. Main memory 702 may be adapted to communicate with display unit 716. Display unit 716 may comprise a computer monitor or similar means for displaying graphics, text, and other data received from main memory 702.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 are in the form of a plurality of signals, hereinafter referred to as signals 728, which may be electronic, electromagnetic, optical, or other signals capable of being received by communications interface 724. Signals 728 are provided to communications interface 724 via a communications path 726. Communications path 726 carries signals 728 and may be implemented using wire or cable, fiber optics, a phone line, a cellular phone link, an RF link or other communications channels.

In this document, the terms "computer program medium" and "computer usable medium" are used to generally refer to media such as removable storage unit 718, removable storage unit 722, a hard disk installed in hard disk drive 712, and signals 728 carried over communications path 726. Computer program medium and computer usable medium can also refer to memories, such as main memory 708 and secondary memory 710, which can be memory semiconductors (e.g. DRAMs, etc.). These computer program products are means for providing software to computer system 700.

Computer programs (also called computer control logic) are stored in main memory 708 and/or secondary memory 710. Computer programs may also be received via communications interface 724. Such computer programs, when executed, enable computer system 700 to implement the present invention as discussed herein. In particular, the computer programs, when executed, enable processor 704 to implement the processes of the present invention, such as the steps in the methods illustrated by flowcharts in FIGS. 5-6 discussed above. Accordingly, such computer programs represent controllers of the computer system 700. Where the invention is implemented using software, the software may be stored in a computer program product and loaded into computer system 700 using removable storage drive 714, interface 720, hard drive 712 or communications interface 724.

Embodiments of the invention also may be directed to computer products comprising software stored on any computer usable medium. Such software, when executed in one or more data processing device, causes a data processing device(s) to operate as described herein. Embodiments of the invention employ any computer usable or readable medium, known now or in the future. Examples of computer usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A method of auditing a storage donor that stores a data block on behalf of a data owner in a distributed storage system, the method comprising:
   identifying a storage assignment that specifies the storage donor has been assigned the data block for storage for a data owner;
   generating an index for the data block, the index indicating a plurality of sub-blocks of data and including a tree comprising a root node and a plurality of leaf nodes, wherein the root node references the data block and each of the plurality of leaf nodes reference one sub-block; and
   auditing the storage donor to determine if the storage donor is maintaining storage of the assigned data block by:
   (a) selecting nodes of the index, the selected nodes comprising at least the root node and at least one leaf node;
   (b) generating a hash value for the selected nodes;
   (c) sending a query to the storage donor, the query identifying at least one of the selected nodes;
   (d) receiving a query response comprising a response hash generated by the query donor based on the sent query; and
   (e) comparing the hash value with the response hash to verifying the presence of the data block.

2. The method of claim 1, the method comprising:
   generating a token comprising the root node;
   generating a signed token by signing the token with an encryption key; and
   sending, to the data owner, the signed token.

3. The method of claim 2, wherein the token further comprises data indicating the storage donor and data indicating the data owner.

4. The method of claim 3, wherein the storage donor is configured to store the data block in response to i) verifying that signed token and ii) determining that the token comprises the data indicating the data owner.

5. The method of claim 2, wherein the encryption key is a private key.

6. The method of claim 5, wherein the storage donor is configured to verify the signed token by decrypting the signed token with a public key that corresponds to the private key.

7. The method of claim 5, wherein the storage donor is configured to store the data block after verifying the signed token.

8. The method of claim 2, wherein the encryption key is a shared key.

9. A system for auditing a storage donor that stores a data block on behalf of a data owner in a distributed storage system, the system comprising:
   a storage auditor configured to:
      identify a storage assignment that specifies the storage donor has been assigned the data block for storage for a data owner;
      generate an index for the data block, the index indicating a plurality of sub-blocks of data and including a tree comprising a root node and a plurality of leaf nodes, wherein the root node references the data block and each of the plurality of leaf nodes reference one sub-block; and
      audit the storage donor to determine if the storage donor is maintaining storage of the assigned data block by:
         (a) selecting nodes of the index, the selected nodes comprising at least the root node and at least one leaf node;
         (b) generating a hash value for the selected nodes;
         (c) sending a query to the storage donor, the query identifying at least one of the selected nodes;
         (d) receiving a query response comprising a response hash generated by the query donor based on the sent query;
         (e) comparing the hash value with the response hash to verifying the presence of the data block;
   a storage donor configured to:
      locally store the data block;
      generate a second index for the data block, the second index indicating a plurality of sub-blocks of data and including a tree a second root node and a second plurality of leaf nodes, wherein the second root node references the data block and each of the second plurality of leaf nodes reference one sub-block;
      receive the query;
      generate the response hash based on the query;
      generate the query response comprising the response hash; and
      send the query response to the storage auditor.

10. The system of claim 9, wherein the storage auditor is further configured to:
    generate a token comprising the root node;
    generate a signed token by signing the token with an encryption key; and
    send, to the data owner, the signed token.

11. The system of claim 10, wherein the token further comprises data indicating the storage donor and data indicating the data owner.

12. The system of claim 11, wherein the storage donor is further configured to store the data block in response to i) verifying that signed token and ii) determining that the token comprises the data indicating the data owner.

13. The system of claim 10, wherein the encryption key is a private key.

14. The system of claim 13, wherein the storage donor is configured to verify the signed token by decrypting the signed token with a public key that corresponds to the private key.

15. The system of claim 13, wherein the storage donor is further configured to store the data block after verifying the signed token.

16. The system of claim 10, wherein the encryption key is a shared key.

17. A system for auditing a storage donor that stores a data block on behalf of a data owner in a distributed storage system, the system comprising:
    the data owner configured to:
       generate a first index for the data block, the index indicating a plurality of sub-blocks of data and including a tree comprising a root node and a plurality of leaf nodes, wherein the root node references the data block and each of the plurality of leaf nodes reference one sub-block;
       generate a signed fingerprint for the data block with a private key;
       transmit the data block and the signed fingerprint for storage by the storage donor;
    the storage donor configured to:
       receive the data block and the signed fingerprint;

verify the signed fingerprint using a public key that corresponds to the private key;

responsive to verifying the signed fingerprint, maintain storage of the data block;

a storage auditor configured to:

generate a second index for the data block, the second index indicating the plurality of sub-blocks of data and including the tree comprising the root node; and audit the storage donor to determine if the storage donor is maintaining storage of the assigned data block by:
  (a) selecting nodes of the index, the selected nodes comprising at least the root node and at least one leaf node;
  (b) generating a hash value for the selected nodes;
  (c) sending a query to the storage donor, the query identifying at least one of the selected nodes;
  (d) receiving a query response comprising a response hash generated by the query donor based on the sent query; and
  (e) comparing the hash value with the response hash to verifying the presence of the data block.

18. The system of claim 17, wherein to generate a signed fingerprint for the data block with a private key, the data owner is configured to sign the root node with the private key.

19. The system of claim 17, wherein the storage auditor is further configured to provide the public key to the storage donor.

20. The system of claim 17, wherein the data owner is further configured to provide the public key to the storage donor.

\* \* \* \* \*